United States Patent
Yamaguchi

(10) Patent No.: US 8,797,614 B2
(45) Date of Patent: Aug. 5, 2014

(54) CREATING A COLOR CONVERSION TABLE BY PERFORMING COLOR CONVERSION USING A 3D AND 1D TABLE AFTER LIMITING TOTAL COLOR MATERIAL AMOUNT

(71) Applicant: Takeshi Yamaguchi, Hachioji (JP)

(72) Inventor: Takeshi Yamaguchi, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 43 days.

(21) Appl. No.: 13/713,195

(22) Filed: Dec. 13, 2012

(65) Prior Publication Data

US 2013/0163011 A1 Jun. 27, 2013

(30) Foreign Application Priority Data

Dec. 27, 2011 (JP) ................................. 2011-284963

(51) Int. Cl.
*H04N 1/60* (2006.01)

(52) U.S. Cl.
USPC .......................... 358/521; 358/523; 358/529

(58) Field of Classification Search
None
See application file for complete search history.

(56) References Cited

U.S. PATENT DOCUMENTS

| | | | |
|---|---|---|---|
| 5,719,956 A * | 2/1998 | Ogatsu et al. ................. 382/167 |
| 6,241,339 B1 * | 6/2001 | Kondo ............................. 358/1.1 |
| 6,985,252 B1 * | 1/2006 | Kubo .............................. 358/518 |
| 7,355,750 B2 * | 4/2008 | Saito et al. ..................... 358/523 |
| 7,855,802 B2 * | 12/2010 | Newman et al. .............. 358/518 |
| 8,416,459 B2 * | 4/2013 | Ito et al. ......................... 358/518 |
| 8,634,117 B2 * | 1/2014 | Fukuda et al. ................. 358/518 |
| 2007/0058188 A1 * | 3/2007 | Nakahara ...................... 358/1.13 |
| 2011/0051208 A1 * | 3/2011 | Hirano et al. ................. 358/518 |
| 2011/0299102 A1 * | 12/2011 | Matsuzaki ...................... 358/1.9 |
| 2012/0050766 A1 * | 3/2012 | Saiki ................................ 358/1.9 |
| 2012/0147393 A1 * | 6/2012 | Matsuzaki ...................... 358/1.9 |
| 2012/0147394 A1 * | 6/2012 | Matsuzaki ...................... 358/1.9 |
| 2012/0206743 A1 * | 8/2012 | Murakami ...................... 358/1.9 |
| 2012/0243011 A1 * | 9/2012 | Fukuda et al. ................. 358/1.9 |
| 2013/0003091 A1 * | 1/2013 | Matsuzaki ...................... 358/1.9 |
| 2013/0342853 A1 * | 12/2013 | Nakashio ........................ 358/1.1 |

FOREIGN PATENT DOCUMENTS

JP 2007-089031 A 4/2007

* cited by examiner

*Primary Examiner* — Scott A Rogers
(74) *Attorney, Agent, or Firm* — Buchanan Ingersoll & Rooney PC

(57) ABSTRACT

Disclosed are a device, a method, and a storage medium to create a color conversion table. According to one implementation, a color conversion table creating device includes, a color material amount limiting processing section; a first color conversion processing section; a second color conversion processing section; a combining section; a color material amount limiting inverse conversion processing section; and an output value determining section. The color material amount limiting processing section performs color material amount limiting of an input value in the color conversion table. The color material limiting inverse conversion processing section performs inverse conversion of the color material amount limiting after color conversion and combining the CMYK components. The output value determining section sets the inverted CMYK color components as an output value in the color conversion table.

4 Claims, 16 Drawing Sheets

FIG. 8

EXECUTE — 352

1. CHART OUTPUT — A21
   [PRINT] — B11

2. MEASURE — A22
   [START] — B12
   [STOP]

A23

| NUMBER | C% | M% | Y% | K% | L* | a* | b* | C DENSITY | M DENSITY | Y DENSITY | K DENSITY |
|---|---|---|---|---|---|---|---|---|---|---|---|
| 1 | 0 | 0 | 0 | 0 | 93.58 | -0.04 | 0.24 | 0.08 | 0.08 | 0.09 | 0.09 |
| 2 | 0 | 10 | 0 | 0 | 90.2 | 6.42 | -1.51 | 0.09 | 0.15 | 0.12 | 0.13 |
| 3 | 0 | 20 | 0 | 0 | 85.37 | 14.91 | -3.05 | 0.11 | 0.25 | 0.18 | 0.19 |
| 4 | 0 | 40 | 0 | 0 | 76.08 | 31.65 | -5.65 | 0.14 | 0.45 | 0.3 | 0.31 |
| 5 | 0 | 70 | 0 | 0 | 62.57 | 55.77 | -6.79 | 0.2 | 0.84 | 0.51 | 0.48 |
| 6 | 0 | 100 | 0 | 0 | 49.95 | 76.15 | -0.41 | 0.28 | 1.55 | 0.82 | 0.66 |
| 7 | 5 | 5 | 5 | 5 | 88.66 | -0.11 | 0.35 | 0.15 | 0.15 | 0.16 | 0.15 |
| 8 | 0 | 0 | 0 | 0 | 91.03 | -0.08 | 0.15 | 0.12 | 0.12 | 0.12 | 0.12 |
| 9 | 0 | 0 | 5 | 0 | 93.32 | -1.52 | 5.93 | 0.08 | 0.09 | 0.13 | 0.09 |
| 10 | 0 | 5 | 0 | 0 | 91.74 | 3.81 | -0.9 | 0.09 | 0.12 | 0.1 | 0.11 |
| 11 | 5 | 0 | 0 | 0 | 91.12 | -3.39 | -3.4 | 0.14 | 0.1 | 0.09 | 0.13 |

A24

B13 — [REGISTER]    [CANCEL]

FIG.11A

| INPUT | | | OUTPUT | | |
|---|---|---|---|---|---|
| C | M | Y | C | M | Y |
| 0 | 0 | 0 | 0 | 0 | 0 |
| ⋮ | ⋮ | ⋮ | ⋮ | ⋮ | ⋮ |
| 40 | 40 | 40 | 30 | 40 | 50 |
| ⋮ | ⋮ | ⋮ | ⋮ | ⋮ | ⋮ |
| 75 | 75 | 75 | 65 | 75 | 80 |
| ⋮ | ⋮ | ⋮ | ⋮ | ⋮ | ⋮ |
| 80 | 80 | 80 | 70 | 80 | 90 |
| ⋮ | ⋮ | ⋮ | ⋮ | ⋮ | ⋮ |
| 100 | 100 | 100 | 100 | 100 | 100 |

FIG.11B

| INPUT | OUTPUT |
|---|---|
| K | K |
| 0 | 0 |
| ⋮ | ⋮ |
| 10 | 11 |
| ⋮ | ⋮ |
| 50 | 55 |
| ⋮ | ⋮ |
| 100 | 100 |

FIG.16A
PRIOR ART

| INPUT | | | OUTPUT | | |
|---|---|---|---|---|---|
| C | M | Y | C | M | Y |
| 0 | 0 | 0 | 0 | 0 | 0 |
| ⋮ | ⋮ | ⋮ | ⋮ | ⋮ | ⋮ |
| 80 | 80 | 80 | 70 | 80 | 90 |
| ⋮ | ⋮ | ⋮ | ⋮ | ⋮ | ⋮ |
| 100 | 100 | 100 | 100 | 100 | 100 |

FIG.16B
PRIOR ART

| INPUT | OUTPUT |
|---|---|
| K | K |
| 0 | 0 |
| ⋮ | ⋮ |
| 50 | 55 |
| ⋮ | ⋮ |
| 100 | 100 |

CREATING A COLOR CONVERSION TABLE BY PERFORMING COLOR CONVERSION USING A 3D AND 1D TABLE AFTER LIMITING TOTAL COLOR MATERIAL AMOUNT

BACKGROUND

1. Field of the Invention

The present invention relates to a color conversion table creating device, a color conversion table creating method, and storage medium.

2. Description of Related Art

Generally, in order to create a color conversion LUT (Look Up Table) to convert image data including cyan (C), magenta (M), yellow (Y), and black (K) to CMYK data for output from a printer, it is necessary to print a color patch formed from a combination of CMYK with a printer, and to measure the color patch with a color measuring device to correspond a CMYK value and a color measurement value.

Here, if a color patch formed from a combination of four colors of CMYK is used, the number of measurements becomes large. Therefore, there is known a method to create a three dimensional LUT of CMY→CMY based on the color measurement value of the color patch formed from the combination of CMY and a one dimensional LUT of K→K based on the color measurement value of the tone patch of single color K so that color conversion of CMY component and K component are performed separately.

For example, there is proposed a technique in which the unbalance of gray balance is corrected by using a three dimensional LUT which corrects the CMY component of the image data and a one dimensional LUT which corrects the K component of the image data (see Japanese Patent Application Laid-Open Publication No. 2007-89031).

However, according to the conventional technique, the CMY component and the K component are calculated separately. Therefore, when the color material amount is limited by limiting a total amount of each color component after color conversion, there is a possibility that the CMYK value changes by the color material amount limit, the corresponding relation with the three dimensional LUT used in color conversion does not match and the accuracy of color conversion decreases. When all of the color material (toner, ink, etc.) which can be output is used in a electro-photographic printer, inkjet printer, etc., problems such as fusing defect of toner in an electro-photographic printer and blurring in an inkjet printer, etc. occur. Therefore, normally the total amount of the color material is fixed.

Described below are the problems of the convention processing which separately refers the three dimensional LUT of CMY and the one dimensional LUT of K for the CMYK value to perform color conversion and then limits the toner amount of the CMYK value.

FIG. 14 is an example of conversion when the total CMYK amount is relatively small and FIG. 15 is an example of conversion when the total CMYK amount is large and the total toner amount is adjusted. FIG. 16A is an example of a CMY three dimensional LUT and FIG. 16B is an example of a K one dimensional LUT.

As shown in FIG. 14, when the input CMYK value is (80, 80, 80, 0), first the values are divided between CMY value (80, 80, 80) and the K value (0). For the CMY value (80, 80, 80), the CMY three dimensional LUT shown in FIG. 16A is referred, and the CMY value is converted to (70, 80, 90). For the K value (0), the K one dimensional LUT shown in FIG. 16B is referred, and the K value is converted to (0).

Next, the converted CMY value (70, 80, 90) and the converted K value (0) are combined and it is judged whether there is a toner amount limit on the combined CMYK value (70, 80, 90, 0). Here, when the toner amount limit value (maximum value of total CMYK amount) is 250%, the total CMYK amount is 70+80+90+0=240 and is not more than the toner amount limit value. Therefore, the CMYK value is not limited by the toner amount limit and the final output CMYK value is (70, 80, 90, 0). As described here, when the total CMYK amount is relatively small, the CMYK value does not change by the toner amount limiting and therefore there is no problem.

Alternatively, as shown in FIG. 15, when the input CMYK value is (80, 80, 80, 100), first the values are divided between the CMY value (80, 80, 90) and the K value (100). For the CMY value (80, 80, 80), the CMY three dimensional LUT shown in FIG. 16A is referred, and the CMY value is converted to (70, 80, 90). For the K value (100), the K one dimensional LUT shown in FIG. 16B is referred and the K value is converted to (100).

Next, the converted CMY value (70, 80, 90) and the converted K value (100) are combined and it is judged whether there is a toner amount limit on the combined CMYK value (70, 80, 90, 100). Here, the total CMYK amount is 70+80+90+100=340 and exceeds the toner amount limit value. Therefore, the toner amount is limited and the final output CMYK value is, for example, (40, 50, 60, 100). Here, the CMY value (40, 50, 60) is a value which has no relation with the output value (70, 80, 90) from the referred CMY three dimensional LUT and is a value with no guarantee.

SUMMARY

The present invention has been made in consideration of the above problems, and it is one of main objects to prevent reduction of accuracy of color conversion using a color conversion table by considering color material amount being limited after color conversion when a color conversion table is created based on a three dimensional table of cyan, magenta, and yellow and a one dimensional table of black.

In order to achieve at least one of the above-described objects, according to an aspect of the present invention, there is provided a color conversion table creating device which creates a color conversion table for color conversion from input image data including cyan, magenta, yellow, and black to output image data including cyan, magenta, yellow, and black, the device including:

a color material amount limiting processing section which performs color material amount limiting which limits a total amount of color components for each combination of an input value in the color conversion table;

a first color conversion processing section which performs color conversion on a cyan component, a magenta component, and a yellow component after the color material amount limiting by the color material amount limiting processing section, using a three dimensional table for color conversion from a cyan component, a magenta component, and a yellow component of the input image data to a cyan component, a magenta component, and a yellow component of the output image data;

a second color conversion processing section which performs color conversion on a black component after the color material amount limiting by the color material amount limiting processing section using a one dimensional table for color conversion from a black component of the input image data to a black component of the output image data;

a combining section which combines the cyan component, the magenta component, and the yellow component after the color conversion using the three dimensional table with the black component after the color conversion using the one dimensional table;

a color material limiting inverse conversion processing section which performs inverse conversion of the color material amount limiting on the cyan component, the magenta component, the yellow component, and the black component combined by the combining section; and an output value determining section which sets the cyan component, the magenta component, the yellow component, and the black component after the inverse conversion of the color material amount limiting by the color material amount limiting inverse conversion processing section as a combination of an output value in the color conversion table.

Preferably, the color conversion table creating device further includes:

a second color material amount limiting inverse conversion processing section which performs inverse conversion of the color material amount limiting on the cyan component, the magenta component, and the yellow component after the color material amount limiting by the color material amount limiting processing section; and a second color material amount limiting processing section which performs color material amount limiting on the cyan component, the magenta component, and the yellow component after the color conversion using the three dimensional table, wherein the first color conversion processing section performs color conversion using the three dimension table on the cyan component, the magenta component, and the yellow component after the inverse conversion of the color material amount limiting by the second color material amount limiting inverse conversion processing section; and the combining section combines the cyan component, the magenta component, and the yellow component after the color material amount limiting by the second color material amount limiting processing section, with the black component after the color conversion using the one dimensional table.

BRIEF DESCRIPTION OF THE DRAWINGS

The present invention will become more fully understood from the detailed description given hereinbelow and the appended drawings, and thus are not intended to define the limits of the present invention, and wherein;

FIG. 8 is an example of a chart measuring screen displayed on the color conversion table creating device;

FIG. 11A is an example of a three dimensional LUT of CMY→CMY;

FIG. 11B is an example of a one dimensional LUT of K→K;

FIG. 16A is an example of a conventional CMY→CMY three dimensional LUT; and

FIG. 16B is an example of a conventional K→K one dimensional LUT.

DETAILED DESCRIPTION OF PREFERRED EMBODIMENTS

Below, an embodiment of the color conversion table creating device of the present invention is described.

Figure 1:
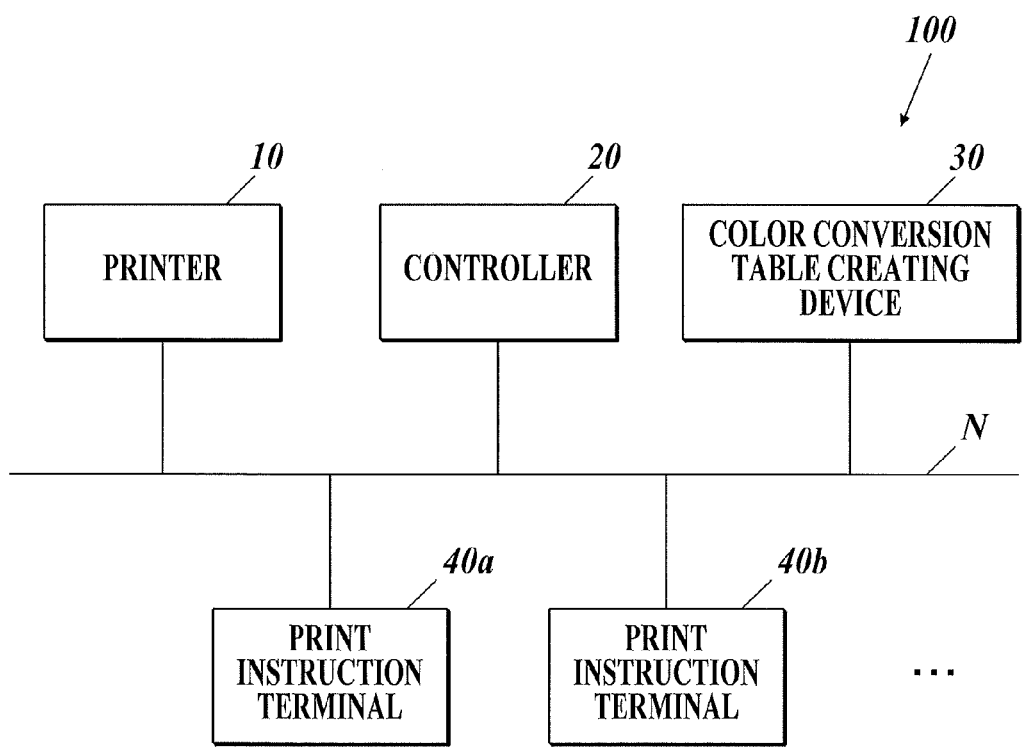
FIG. 1 is a diagram showing a system configuration of a print system.

FIG. 1 shows a system configuration of a print system 100. As shown in FIG. 1, the print system 100 includes a printer 10, a controller 20, a color conversion table creating device 30, print instruction terminals 40a, 40b, etc. and each device is connected to each other through a communication network N to enable data communication.

The printer 10 is an image forming apparatus which prints based on image data (CMYK data) in a bitmap format received from the controller 20. The printer 10 uses toner as color material to form an image in an electro-photographic format. Specifically, the printer 10 includes a photoreceptor drum, a charging section which charges the photoreceptor drum, an exposing section which exposes light to scan a surface of the photoreceptor drum based on the image data (CMYK), a developing section which attaches toner of each color of CMYK to the photoreceptor drum, a transferring section which transfers a toner image formed on the photoreceptor drum on print paper, a fusing section which fuses the toner image formed on the print paper, and the like.

The controller 20 performs processing such as rasterizing, color conversion, screening, and toner amount limit as color material amount limit on the print data transmitted from the print instruction terminals 40a, 40b, etc. The controller 20 transmits the processed image data to the printer 10. The controller 20 can be included in the printer 10. The controller 20 and the printer 10 can be connected through PCI connection, exclusive line, etc.

The color conversion table creating device 30 uses a color measurement value of a chart (color chart) for creating a color conversion table output from the printer 10 to create a color conversion table of CMYK→CMYK (color conversion LUT). The color conversion LUT is a table showing corresponding relation to perform color conversion of input image data including cyan, magenta, yellow, and black to output image data including cyan, magenta, yellow, and black. The color conversion table is created for each output condition of printing such as paper type, screen type, etc. The color conversion table creating device 30 can be included in the controller 20 or the printer 10.

The print instruction terminals 40a, 40b, etc. use the printer driver program and dedicated software to instruct print to the controller 20. Specifically, the print instruction terminals 40a, 40b, etc. generate print data described with a page description language (PDL) which can be interpreted by the controller 20 and the generated print data is transmitted to the controller 20.

Figure 2:
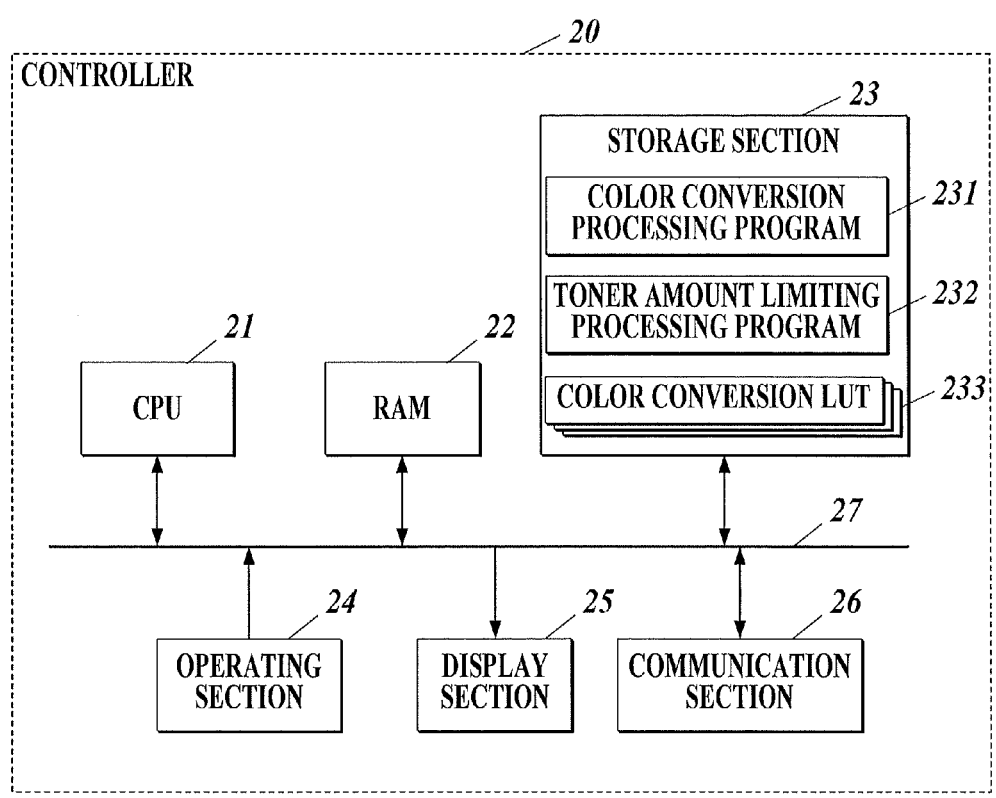
FIG. 2 is a block diagram showing a functional configuration of a controller.

FIG. 2 shows a functional configuration of the controller 20. As shown in FIG. 2, the controller 20 includes a CPU (Central Processing Unit) 21, a RAM (Random Access Memory) 22, a storage section 23, an operating section 24, a display section 25, a communication section 26, etc. and each section is connected to each other through a bus 27.

The CPU 21 centrally controls the processing operation of each section of the controller 20. According to the operation signal input from the operating section 24 or the instruction signal received by the communication section 26, the CPU 21 reads various processing programs stored in the storage section 23 and expands the programs in the RAM 22, and the CPU 21 performs various processing in coordination with the programs.

The RAM 22 forms a work area which temporarily stores various processing programs performed by the CPU 21 and the data regarding the programs.

The storage section 23 includes a storage device such as a nonvolatile semiconductor memory, hard disk, etc., and stores various processing programs, data regarding the various programs and the like. For example, the storage section 23 stores a color conversion processing program 231, a toner amount limiting processing program 232, a color conversion LUT 233, and the like.

The operating section 24 includes a keyboard including cursor keys, character input keys, various function keys, etc. and a pointing device such as a mouse, and the operating section 24 receives input of operation by the user. The operating section 24 outputs to the CPU 21 an operating signal input by the key operation on the keyboard or the mouse operation.

The display section 25 includes an LCD (Liquid Crystal Display) and displays various operation screens and various processing results according to the instruction from the CPU 21.

The communication section 26 transmits and receives data between an external device through the communication network N. For example, the communication section 26 receives the color conversion LUT created by the color conversion table creating device 30. The communication section 26 receives the print data from the print instruction terminals 40a, 40b, etc. The communication section 26 transmits the image data in a bitmap format to the printer 10.

The CPU 21 stores the color conversion LUT received from the color conversion table creating device 30 as the color conversion LUT 233 in the storage unit 23.

The CPU 21 analyzes the print data (PDL data) received from the print instruction terminals 40a, 40b, etc. and expands the image data in a bitmap format (RIP (Raster Image Processor) processing).

In coordination with the color conversion processing program 231, the CPU 21 uses the color conversion LUT 233 stored in the storage section 23 to perform the color conversion of CMYK→CMYK on the image data. Specifically, the CPU 21 refers to the color conversion LUT 233 and obtains the combination of the output value corresponding to the combination of the input value which matches the CMYK value of the input image data or the combination of the input value which is close to the CMYK value of the input image data. Then, the CPU 21 performs interpolation processing to calculate the CMYK value after color conversion.

In coordination with the toner amount limiting processing program 232, the CPU 21 limits toner amount of the image data after color conversion. In the toner amount limiting, the mapping from the CMYK value before processing to the CMYK value after processing can be shown by a formula or can be obtained by interpolation processing using the look up table.

Figure 3:
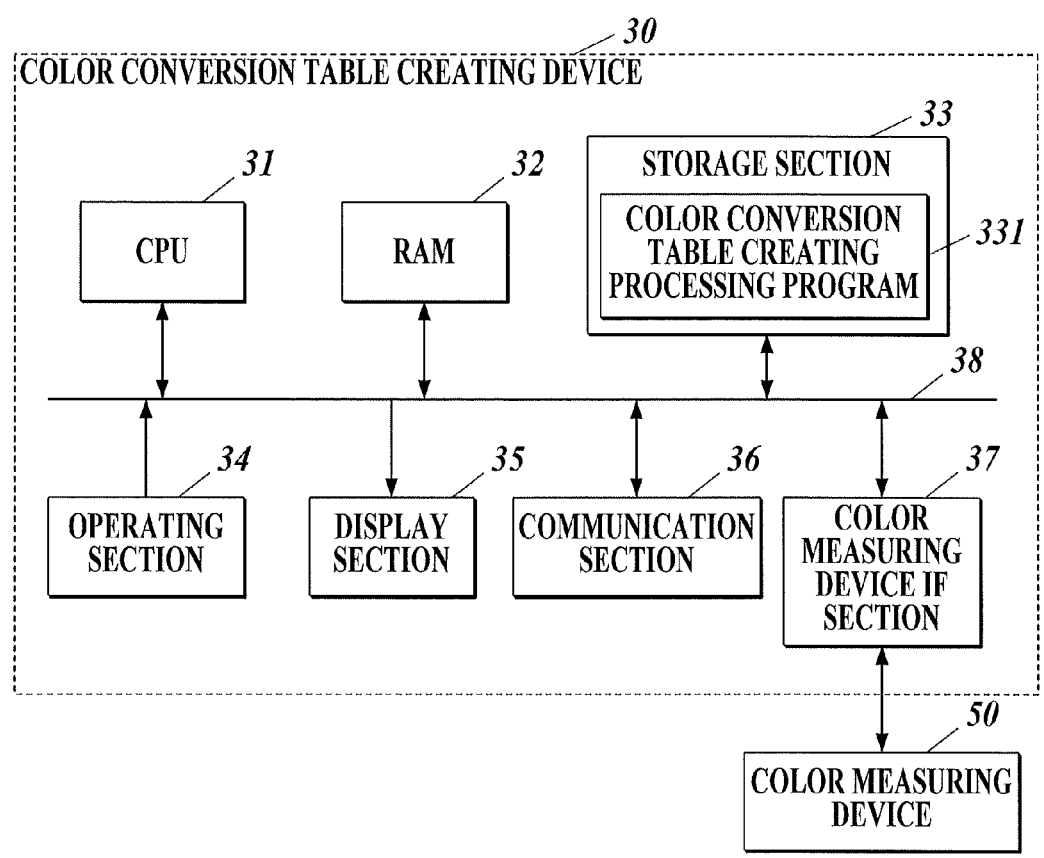
FIG. 3 is a block diagram showing a functional configuration of a color conversion table creating device.

FIG. 3 shows a functional configuration of the color conversion table creating device 30. As shown in FIG. 3, the color conversion table creating device 30 includes a CPU 31, a RAM 32, a storage section 33, an operating section 34, a display section 35, a communication section 36, a color measuring device IF (interface) section 37 and the like, and each section is connected to each other through a bus 38.

The CPU 31 centrally controls the processing operation of each section of the color conversion table creating device 30. According to the operation signal input from the operating section 34 or the instruction signal received by the communication section 36, the CPU 31 reads various processing programs stored in the storage section 33 and expands the programs in the RAM 32, and the CPU 31 performs various processing in coordination with the programs.

The RAM 32 forms a work area which temporarily stores various processing programs performed by the CPU 31 and the data regarding the programs.

The storage section 33 includes a storage device such as a nonvolatile semiconductor memory, hard disk, etc., and stores various processing programs, data regarding the various programs and the like. For example, the storage section 33 stores a color conversion table creating processing program 331, and the like.

The operating section 34 includes a keyboard including cursor keys, character input keys, various function keys, etc. and a pointing device such as a mouse, and the operating section 34 receives input of operation by the user. The operating section 34 outputs to the CPU 31 an operating signal input by the key operation on the keyboard or the mouse operation. For example, the operating section 34 is used for instructing the printer 10 to print the chart for creating the color conversion LUT.

The display section 35 includes an LCD (Liquid Crystal Display) and displays various operation screens and various processing results according to the instruction from the CPU 31.

The communication section 36 transmits and receives data between an external device through the communication network N. For example, the communication section 36 transmits the color conversion LUT created in the color conversion table creating device 30 to the controller 20.

The color measuring device IF section 37 receives from the color measuring device 50 the color measurement value obtained by measuring the color of each patch of the chart for creating the color conversion LUT.

Figure 4:
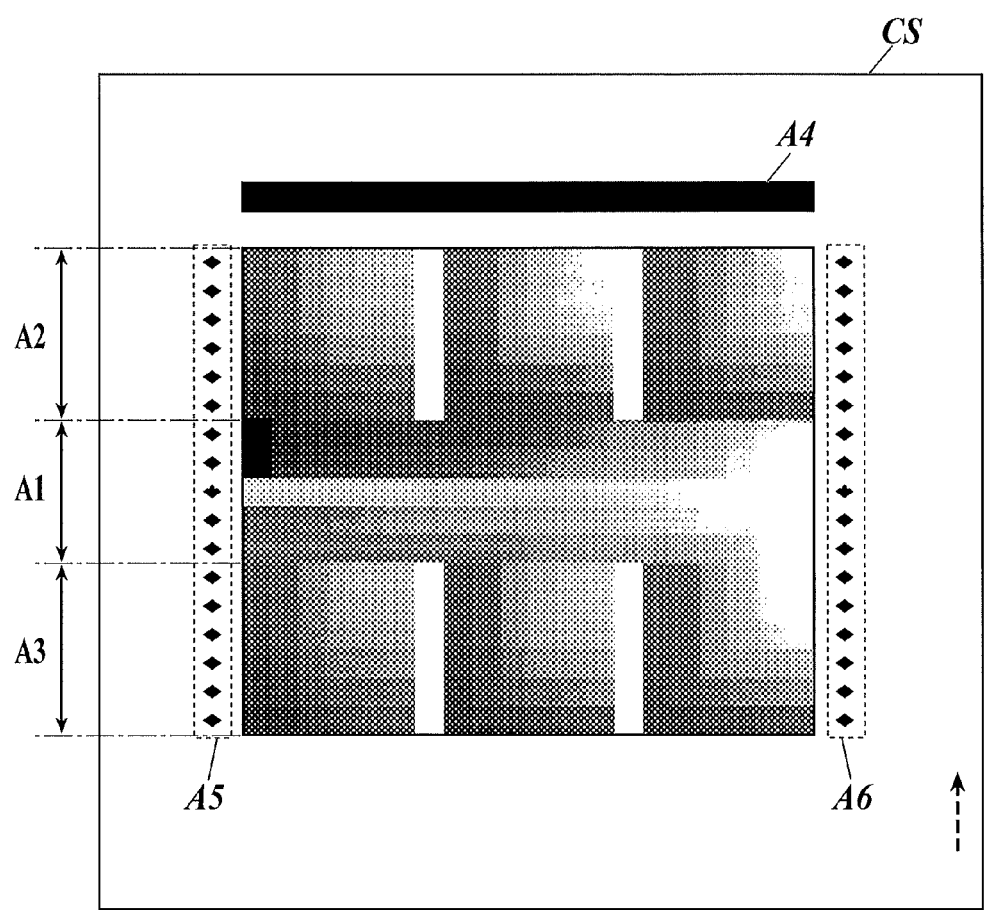
FIG. 4 is an example of a chart sample.

FIG. 4 shows a chart sample CS which is a sample of an image used in output of the chart for creating the color conversion LUT. The chart sample CS includes a tone patch area A1 positioned in a center portion and CMY patch areas A2 and A3 positioned above and below the tone patch area A1.

The tone patch area A1 is provided with patches of twenty tones in the order from the top CMY (mixed color), K, Y, M, C (20×5 patches).

The CMY patch areas A2 and A3 are provided with color patches including at least one color of C, M, Y. In the example shown in FIG. 4, 6×6×6 patches are provided in the CMY patch areas A2 and A3.

The K→K one dimensional LUT is created based on the color measurement value and the white information (color measurement value of the portion of K=0%) of the twenty patches of K in the tone patch area A1 and the CMY→CMY three dimensional LUT is created based on the color measurement value of the patches other than the above.

A black bar A4 in the upper portion of the chart sample CS and diamond marks A5 and A6 on the left and right of the chart sample CS are used by the color measuring device 50 to specify the coordinates of each patch automatically and thus are not essential conditions.

The CPU 31 creates a CMY→CMY three dimensional LUT (hereinafter referred to as CMY three dimensional LUT) for color conversion from the cyan component, the magenta component, and the yellow component of the input image data to the cyan component, the magenta component, and the yellow component of the output image data based on the color measurement value of the patch formed from the combination of CMY of the chart for creating the color conversion LUT.

The CPU 31 creates a K→K one dimensional LUT (hereinafter referred to as K one dimensional LUT) for color conversion from the black component of the input image data to the black component of the output image data based on the color measurement value and the white information of the patch formed from single color K of the chart for creating the color conversion LUT.

The CPU 31 creates a CMYK→CMYK four dimensional LUT (hereinafter referred to as CMYK four dimensional LUT) as the color conversion table for color conversion of input image data including cyan, magenta, yellow, and black to output image data including cyan, magenta, yellow, and black based on the CMY three dimensional LUT and the K one dimensional LUT. According to the present embodiment, the description of simply "color conversion LUT" refers to the CMYK four dimensional LUT. When the color conversion LUT is created, color conversion of CMY→CMY using the CMY three dimensional LUT, color conversion of K→K using the K one dimensional LUT, toner amount limiting, inverse conversion of toner amount limiting is performed.

The toner amount limiting is processing which limits the total toner amount of the color components of the image data to a specified toner amount. Specifically, the toner amount limiting converts the CMYK value before toner amount limiting to the CMYK value after toner amount limiting. According to the present embodiment, the CMYK value before toner amount limiting and the CMYK value after toner amount limiting are determined one to one, and the toner amount limiting is invertible. The toner amount limiting performed in the color conversion table creating device 30 is performed using the same standard by using the same method as the "toner amount limiting performed in the controller 20".

The toner amount limiting inverse conversion converts the CMYK value after the toner amount limiting to the CMYK value before toner amount limiting. The toner amount limiting inverse conversion performed in the color conversion table creating device 30 is the inverse conversion of the "toner amount limiting performed in the controller 20".

Figure 5:
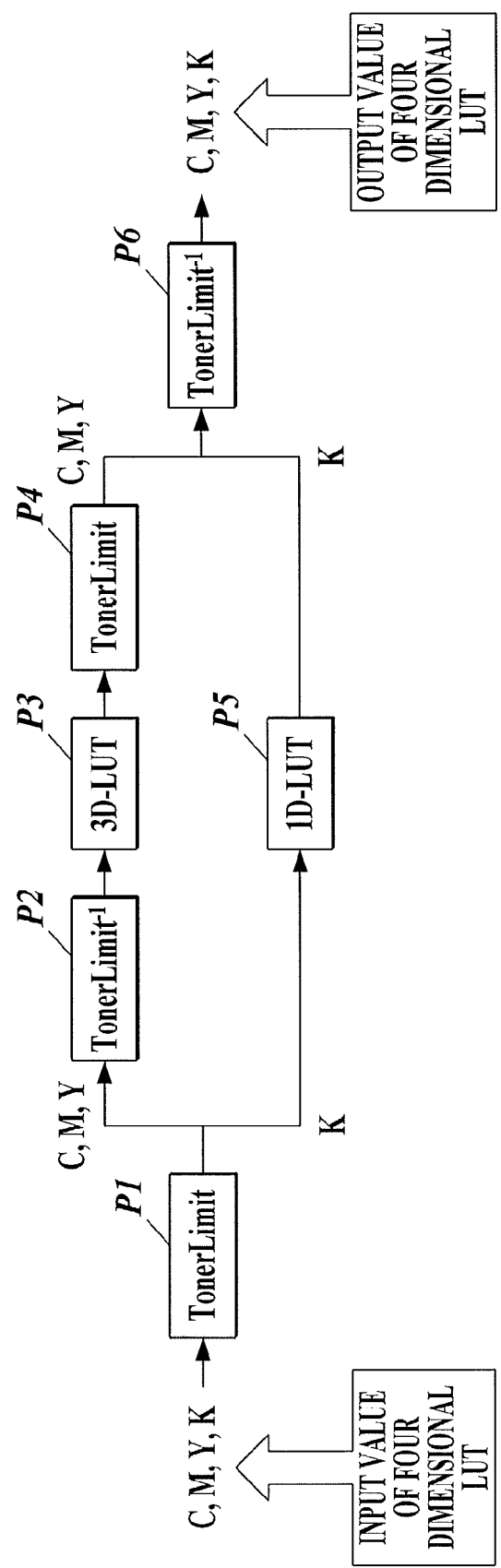
FIG. 5 is a diagram showing an outline of creating processing of a four dimensional LUT of CMYK→CMYK.

FIG. 5 shows an outline of the creating processing of the CMYK four dimensional LUT.

In the creating processing of the CMYK four dimensional LUT, the toner amount limiting performed in the controller 20 is simulated in advance and the CMY three dimensional LUT for when there is a toner amount limit is referred.

The CPU 31 performs each processing P1 to P6 shown in FIG. 5, on each combination (CMYK value) of the input value in the CMYK four dimensional LUT to determine the combination (CMYK value) of the output value in the CMYK four dimensional LUT.

The CPU 31 (color material amount limiting processing section) performs toner amount limiting P1 (described as "TonerLimit" in the figure) which limits the total amount of each color component on the combination of the input value of CMYK in the CMYK four dimensional LUT.

The CPU 31 (second color material amount limiting inverse conversion processing section) performs toner amount limiting inverse conversion (described as "TonerLimit$^{-1}$" in the figure) P2 on the cyan component, the magenta component, and the yellow component after the toner amount limiting P1. In the toner amount limiting inverse conversion P2, the input value of the black component is calculated as 0.

The CPU 31 (first color conversion processing section) performs color conversion (described as "3D-LUT" in the figure) P3 using the CMY three dimensional LUT on the cyan component, the magenta component, and the yellow component after the toner amount limiting inverse conversion P2.

The CPU 31 (second color material limiting processing section) performs toner amount limiting P4 on the cyan component, the magenta component, and the yellow component after the color conversion P3. In the toner amount limiting P4, the input value of the black component is calculated as 0.

The CPU 31 (second color conversion processing section) performs color conversion (described as "1D-LUT" in the figure) P5 using the K one dimensional LUT on the black component after the toner amount limiting P1.

The CPU 31 (combining section) combines the cyan component, the magenta component, and the yellow component after the toner amount limiting P4 with the black component after the color conversion P5.

The CPU 31 (color material amount limiting inverse conversion processing section) performs toner amount limiting inverse conversion P6 on the combined cyan component, magenta component, yellow component and black component.

The CPU 31 (output value determining section) determines the cyan component, the magenta component, the yellow component, and the black component after the toner amount limiting inverse conversion P6 to be the combination of the output value in the CMYK four dimensional LUT.

With this, it is possible to obtain the output value of the CMYK four dimensional LUT considering that the toner amount may be limited later.

In the creating processing of the CMYK four dimensional LUT shown in FIG. 5, among the processing P1 to P6, the toner amount limiting P1, the color conversion P3, the color conversion P5 and the toner amount limiting inverse conversion P6 are necessary processing and the toner amount limiting inverse conversion P2, and the toner amount limiting P4 are processing which may be necessary depending on the contents of the CMY three dimensional LUT.

The present invention creates the CMYK four dimensional LUT using the CMY three dimensional LUT and the K one dimensional LUT and therefore it is clear that the color conversion P3 and the color conversion P5 are necessary.

It is necessary to perform the toner amount limiting P1 before performing the color conversion P3 because the ratio of CMYK changes after the toner amount limiting P1 according to the amount of K. For example, when the toner amount limiting P1 is performed on (c, m, y, k)=(80, 80, 80, 0), the result is (73, 73, 73, 0), when toner amount limiting P1 is performed on (c, m, y, k)=(80, 80, 80, 10), the result is (71, 71, 71, 10) and when toner amount limiting P1 is performed on (c, m, y, k)=(80, 80, 80, 100), the result is (40, 40, 40, 100). The toner amount limiting P1 determines the actual input value of the CMY three dimensional LUT to be referred.

The point of the present invention is to create a CMYK four dimensional LUT considering that the toner amount is limited in the later processing. Therefore, when the CMYK value is calculated with the toner amount limited by the toner amount limiting P1 or the toner amount limiting P4, it is necessary to once return the value to a value where the toner amount is not limited. By performing the toner amount limiting inverse conversion P6, the controller 20 can correctly perform the toner amount limiting later.

When the CMY three dimensional LUT is a LUT created by outputting the chart and measuring the color without limiting the toner amount, the toner amount limiting inverse conversion P2 and the toner amount limiting P4 before and after the color conversion P3 using the CMY three dimensional LUT is not necessary. In this case, the color conversion P3 is performed using the CMY three dimensional LUT on the cyan component, the magenta component, and the yellow component after the toner amount limiting P1, the cyan component, the magenta component, and the yellow component after color conversion P3 is combined with the black component after color conversion P5, and the toner amount limiting inverse conversion P6 is performed on the combined cyan component, magenta component, yellow component, and black component.

However, when the toner amount limit value is less than 300% when the CMY three dimensional LUT is created, the printing needs to be performed with the toner amount of the toner amount limit or more. Therefore, there is a possibility that paper jamming and problems in transfer occur.

Therefore, in practice, usually the CMY three dimensional LUT describing the input and output relation of data before limiting the toner amount is used. In this case, the input value of the CMY three dimensional LUT needs to be a state in which the toner amount is not limited, and therefore, the toner amount limiting inverse conversion P2 needs to be performed before the color conversion P3 using the CMY three dimensional LUT.

When the toner amount limiting inverse conversion P2 is performed, the inverse conversion (P2, P6) are performed one time more compared to the toner amount limiting (P1), and therefore it is necessary to perform the toner amount limiting P4.

Next, the operation of the color conversion table creating device 30 is described.

Figure 6:
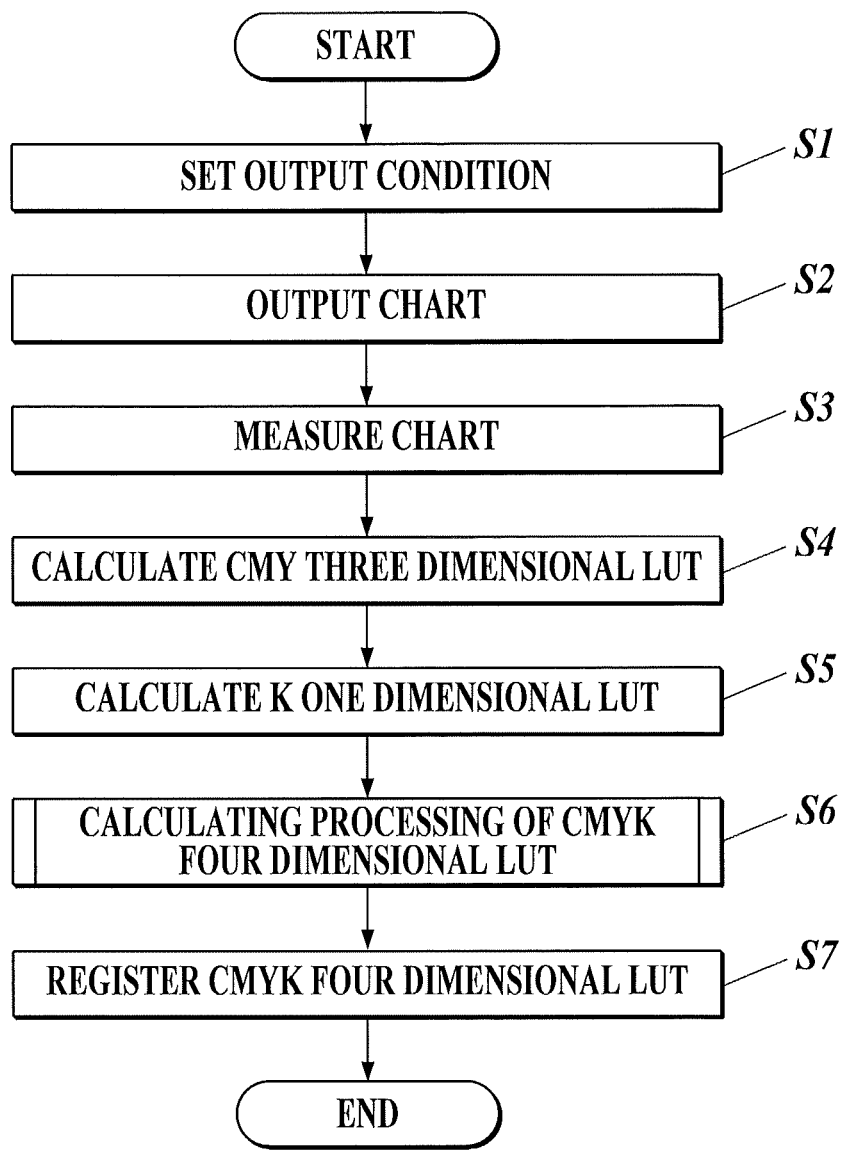
FIG. 6 is a flowchart showing a color conversion table creating processing performed in a color conversion table creating device.

FIG. 6 is a flowchart showing the color conversion table creating processing performed by the color conversion table creating device 30. The color conversion table creating processing is realized with software processing by the CPU 31 in coordination with the color conversion table creating processing program 331 stored in the storage section 33.

First, based on the operation by the user on the operating section 34, the CPU 31 sets the output condition when the chart is printed such as paper type, screen type, etc. (step S1). The color conversion LUT created with this condition is used in the actual color conversion in the RIP processing by the controller 20.

Figure 7:
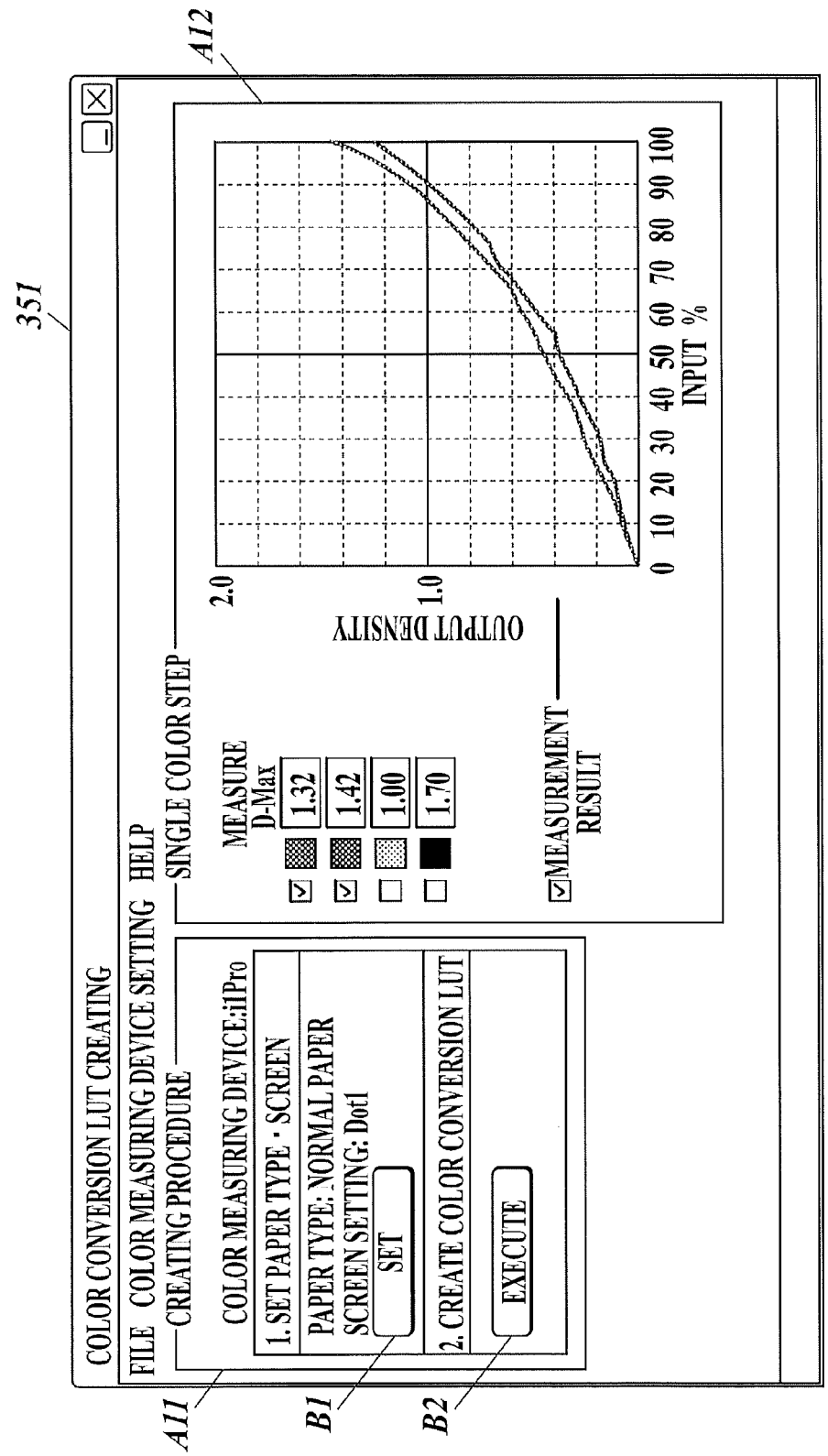
FIG. 7 is an example of a color conversion LUT creating screen displayed on the color conversion table creating device.

FIG. 7 shows an example of the color conversion LUT creating screen 351 displayed in the display section 35 of the color conversion table creating device 30.

The color conversion LUT creating screen 351 includes a creating procedure display area A11 and a graph display area A12.

When the user operates the operating section 34 and a setting button B1 of "1. paper type screen setting" of the creating procedure display area A11 is pressed, the CPU 31 displays the setting screen of the output condition of the chart such as the paper type, screen type, etc. on the display section 35 and the output condition is set.

When the user operates the operating section 34 and an execute button B2 of "2. color conversion LUT creating" of the creating procedure display area A11 is pressed, the CPU 31 displays the chart measuring screen 352 (see FIG. 8) on the display section 35.

The graph display area A12 displays the maximum density of each color of CMYK of the chart measured for creating the LUT and the output density with respect to % of input of the selected color.

FIG. 8 shows an example of the chart measuring screen 352 displayed on the display section 35 of the color conversion table creating device 30.

The chart measuring screen 352 includes a chart output instruction area A21, a measuring instruction area A22, a chart display area A23, and a measurement result display area A24.

When the user operates the operating section 34 and presses a print button B11 of the chart output instruction area A21, the CPU 31 transmits to the controller 20 data of the chart for creating the color conversion LUT with the set output conditions through the communication section 36 (step S2). The controller 20 performs the toner amount limiting on the data of the chart for creating the color conversion LUT and outputs the result to the printer 10. The printer 10 prints the chart based on the data of the chart received from the controller 20.

Next, when the user operates the operating section 34 and a start button B12 of the measurement instruction area A22 is pressed, the measuring of the chart starts and the CPU 31 obtains the color measurement value acquired by measuring each patch of the output chart using the color measuring device 50 through the color measuring device IF section 37 (step S3). The measuring procedure is slightly different depending on the color measuring device 50 used and therefore the procedure can be displayed on the display section 35.

The chart display area A23 displays the image of the measured chart.

The measuring result display area A24 displays the CMYK value (%) corresponding to each patch in the chart, the color measurement value (L*a*b*value) obtained by measuring each patch, and the CMYK density.

When the user operates the operating section 34 and presses a register button B13, the CPU 31 performs the calculation of the color conversion LUT and the registration to the controller 20 (step S4 to step S7).

First, the CPU 31 calculates the CMY three dimensional LUT based on the color measurement value of the patch including C, M, Y of the chart (step S4). Specifically, a typical method is to determine the color measurement value (Japan color, etc.) as the target for each patch in advance and to obtain the output value of the CMY to match the above with the interpolation calculation.

Similarly, the CPU 31 calculates the K one dimensional LUT based on the measurement value and the white information of the patch including only K of the chart (step S5). Regarding K also, the method to obtain by calculation the output value of K to match the predetermined color measurement value is used. With such single color patch, the value connecting the measurement value space (L*value of the L*a*b*space and Y value of XYZ space) linearly may be calculated as the target value from the patch information of white and K 100%.

Next, the CPU 31 calculates the CMYK four dimensional LUT based on the created CMY three dimensional LUT and K one dimensional LUT (step S6). The calculating processing of CMYK four dimensional LUT is described later.

Next, the CPU 31 transmits to the controller 20 the calculated CMYK four dimensional LUT through the communication section 36 (step S7). In the controller 20, the communication section 26 receives the CMYK four dimensional LUT and the CPU 21 stores the CMYK four dimensional LUT as the color conversion LUT 233 in the storage section 23 (registration of the color conversion LUT).

Next, the calculating processing (step S6) of the CMYK four dimensional LUT is described with reference to FIG. 9.

First, the CPU 31 obtains the CMY three dimensional LUT and the K one dimensional LUT acquired by calculation (step S11, S12).

Next, the CPU 31 performs the processing of step S13 to step S20 on the CMYK value (c, m, y, k) corresponding to the input point of the CMYK four dimensional LUT (color conversion LUT) to be created.

As the input points, 11 to the power of 4 (11 tones for each color), 17 to the power of 4, 21 to the power of 4, etc. are often used, but any number of points can be used. Alternatively, the number of tones can be different for each color of CMYK, such as CMY being 17 tones and K being 11 tones, etc.

The CPU 31 performs the toner amount limiting P1 on the c, m, y, k which is the combination of the input value of the CMYK four dimensional LUT (step S13). Here, the CMYK value after the toner amount limiting P1 is $c_1, m_1, y_1, k_1$. For example, when the limit value of the total CMYK amount is 250%, the method used applies 200% through 400% to 200% through 250%. In order to use the density and the color area effectively, in the color material amount limiting such as the toner amount limiting, etc., an effective method is to reduce only CMY without reducing K. According to the present embodiment also, K is not changed by the toner amount limiting.

Next, the CPU 31 performs the toner amount limiting inverse conversion P2 on the CMY value ($c_1, m_1, y_1$) after the toner amount limiting P1 with K=0 (step S14). Here, the CMY value after the toner amount limiting inverse conversion P2 is to be $c_2, m_2, y_2$.

Next, the CPU 31 refers to the CMY three dimensional LUT and performs the color conversion P3 on the CMY value ($c_2, m_2, y_2$) after toner amount limiting inverse conversion P2 (step S15). Here, the CMY value after the color conversion P3 is to be $c_3, m_3, y_3$.

Next, the CPU 31 performs the toner amount limiting P4 on the CMY value ($c_3, m_3, y_3$) after the color conversion P3 with K=0 (step S16). Here, the CMY value after the toner amount limiting P4 is to be $c_4, m_4, y_4$.

Next, the CPU 31 refers to the K one dimensional LUT and performs the color conversion P5 on the K value ($k_1$) obtained in step S13 (step S17). Here, the K value after the color conversion P5 is to be $k_2$.

Next, the CPU 31 combines the CMY value ($c_4, m_4, y_4$) calculated in step S16 with the K value ($k_2$) obtained in step S17 and the CMYK value ($c_5, m_5, y_5, k_5$) is obtained (step S18).

Next, the CPU 31 performs the toner amount limiting inverse conversion P6 on the combined CMYK value ($c_5, m_5, y_5, k_5$) (step S19). Here, the CMYK value after the toner amount limiting inverse conversion P6 is to be ($c_6, m_6, y_6, k_6$).

Next, the CPU 31 stores the CMYK value ($c_6, m_6, y_6, k_6$) after the toner amount limiting inverse conversion P6 as the combination of the output value for the input value (c, m, y, k) in the CMYK four dimensional LUT (step S20).

Next, the CPU 31 judges whether the processing on all input points is finished (step S21). When there is an input point on which processing is not finished (step S21; NO), the processing returns to step S13 and the processing of step S13 to step S20 is repeated on the other input points.

In step S21, when the processing on all input points is finished (step S21; YES), the calculating processing of CMYK four dimensional LUT is finished.

Figure 10:
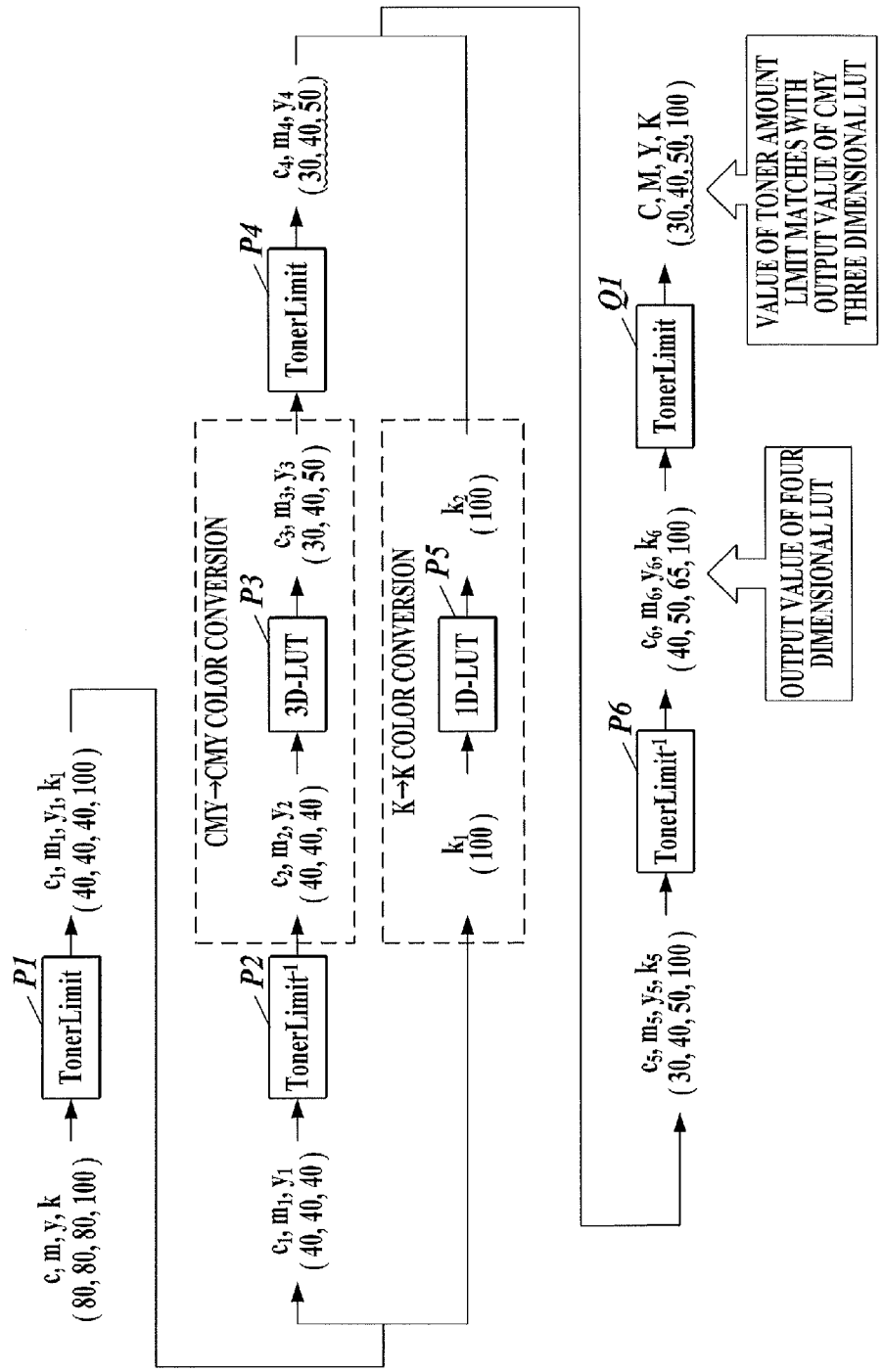
FIG. 10 is a diagram showing a first conversion example.

FIG. 10 shows a first conversion example. FIG. 11A is an example of the CMY three dimensional LUT and FIG. 11B is an example of the K one dimensional LUT.

As shown in FIG. 10, when the combination of the input value is (c, m, y, k)=(80, 80, 80, 100), first the toner amount limiting P1 is performed and the values are to be, for example, ($c_1, m_1, y_1, k_1$)=(40, 40, 40, 100).

Next, the CMYK value after the toner amount limiting P1 is divided between CMY value ($c_1, m_1, y_1$)=(40, 40, 40) and K value ($k_1$)=(100).

The toner amount limiting inverse conversion P2 is performed on the CMY value ($c_1, m_1, y_1$)=(40, 40, 40) with K=0, and the value is converted to ($c_2, m_2, y_2$)=(40, 40, 40).

Next, the CMY three dimensional LUT shown in FIG. 11A is referred and the color conversion P3 is performed on the CMY value ($c_2, m_2, y_2$) after the toner amount limiting inverse conversion P2, and the value is converted to ($c_3, m_3, y_3$)=(30, 40, 50).

Next, the toner amount limiting P4 is performed on the CMY value ($c_3, m_3, y_3$) after the color conversion P3 with K=0, and the value is to be, for example, ($c_4, m_4, y_4$)=(30, 40, 50).

Regarding the K value ($k_1$)=(100), the K one dimensional value LUT shown in FIG. 11B is referred and the color conversion P5 is performed to convert the value to ($k_2$)=(100).

Next, the CMY value ($c_4, m_4, y_4$) (30, 40, 50) after the toner amount limiting P4 is combined with the K value ($k_2$)=(100) after the color conversion P5 to be ($c_5, m_5, y_5, k_5$)=(30, 40, 50, 100).

Next, the toner amount limiting inverse conversion P6 is performed on the combined CMYK value ($c_5, m_5, y_5, k_5$) and the value is converted to, for example ($c_6, m_6, y_6, k_6$)=(40, 50, 65, 100). The value (40, 50, 65, 100) is stored as the output value for the input value (80, 80, 80, 100) of the CMYK four dimensional LUT.

The controller 20 performs color conversion using the CMYK four dimensional LUT created as described above. By performing the CMYK→CMYK color conversion on the input value (80, 80, 80, 100), the output value (40, 50, 65, 100) can be obtained. Then, the controller 20 later performs toner amount limiting Q1 to obtain, for example (30, 40, 50, 100) as the CMYK value output to the printer 10.

It can be understood that the CMY value of the value (30, 40, 50, 100) after the toner amount limiting Q1 in the controller 20 matches with the value (30, 40, 50) where the toner amount limiting P4 is performed on the output value of (40, 40, 40)→(30, 40, 50) of the CMY three dimensional LUT referred when the CMYK four dimensional LUT is created in the color conversion table creating device 30.

Figure 12:
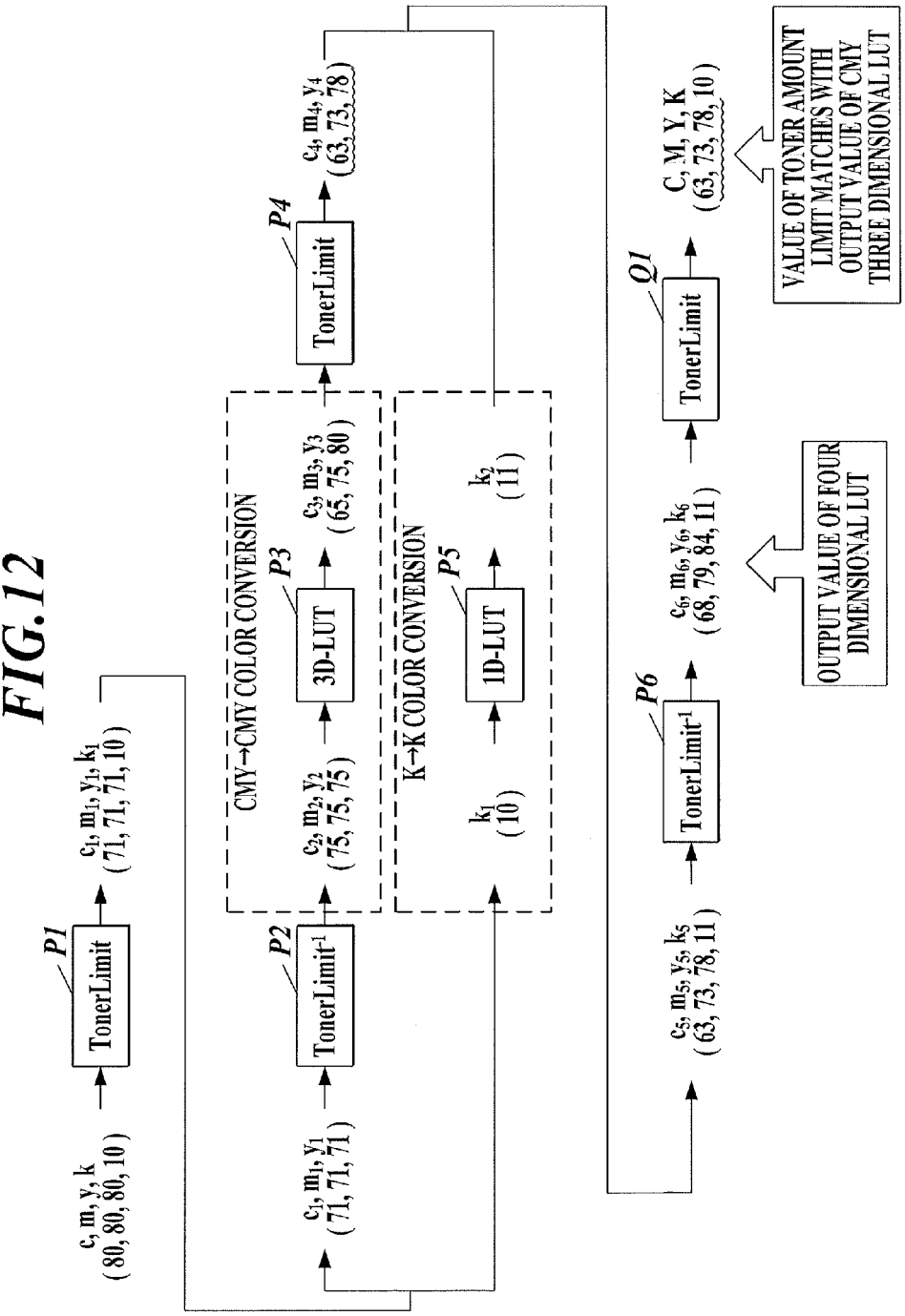
FIG. 12 is a diagram showing a second conversion example.

FIG. 12 shows a second conversion example. The CMY three dimensional LUT and the K one dimensional LUT shown in FIG. 11A and FIG. 11B are used.

As shown in FIG. 12, when the combination of the input value is (c, m, y, k)=(80, 80, 80, 10), first the toner amount limiting P1 is performed and the value is to be, for example, ($c_1, m_1, y_1, k_1$)=(71, 71, 71, 10).

Next, the CMYK value after performing the toner amount limiting P1 is divided between CMY value ($c_1, m_1, y_1$) (71, 71, 71) and K value ($k_1$)=(10).

The toner amount limiting inverse conversion P2 is performed on the CMY value (c1, m1, y1)=(71, 71, 71) with K=0, and the value is converted to (c2, m2, y2)=(75, 75, 75).

Next, the CMY three dimensional LUT shown in FIG. 11A is referred and the color conversion P3 is performed on the CMY value $(c_2, m_2, y_2)$ after the toner amount limiting inverse conversion P2, and the value is converted to $(c_3, m_3, y_3)$ (65, 75, 80).

Next, the toner amount limiting P4 is performed on the CMY value $(c_3, m_3, y_3)$ after the color conversion P3 with K=0, and the value is to be, for example, $(c_4, m_4, y_4)$ (63, 73, 78).

Regarding the K value $(k_1)$=(10), the K one dimensional value LUT shown in FIG. 11B is referred and the color conversion P5 is performed to convert the value to $(k_2)$=(11).

Next, the CMY value $(c_4, m_4, y_4)$=(63, 73, 78) after the toner amount limiting P4 is combined with the K value $(k_2)$=(11) after the color conversion P5 to be $(c_5, m_5, Y_5, k_5)$=(63, 73, 78, 11).

Next, the toner amount limiting inverse conversion P6 is performed on the combined CMYK value $(c_5, m_5, y_5, k_5)$ and the value is converted to, for example $(c_6, m_6, y_6, k_6)$=(68, 79, 84, 11). The value (68, 79, 84, 11) is stored as the output value for the input value (80, 80, 80, 10) of the CMYK four dimensional LUT.

The controller 20 performs color conversion using the CMYK four dimensional LUT created as described above. By performing the CMYK→CMYK color conversion on the input value (80, 80, 80, 10), the output value (68, 79, 84, 11) can be obtained. Then, the controller 20 later performs toner amount limiting Q1 to obtain, for example (63, 73, 78, 10) as the CMYK value output to the printer 10.

It can be understood that the CMY value of the value (63, 73, 78, 10) after toner amount limiting Q1 is performed in the controller 20 matches with the value (63, 73, 78) where the toner amount limiting P4 is performed on the output value of (75, 75, 75)→(65, 75, 80) of the CMY three dimensional LUT referred when the CMYK four dimensional LUT is created in the color conversion table creating device 30.

As described above, according to the color conversion table creating device 30, when the color conversion table is created based on the three dimensional table of cyan, magenta, and yellow and the one dimensional table of black, the toner amount limiting performed after color conversion is considered, and it is possible to prevent the decrease of accuracy of color conversion using the created color conversion table.

The description of the embodiments is one example of the color conversion table creating device of the present invention, and the invention is not limited to the above.

The detailed configuration and the detailed operation of each section of the device can be suitably modified within the scope of the present invention.

For example, in the color conversion table creating device 30, instead of performing the output and measurement of the chart as shown in FIG. 6 and the calculation of the CMY three dimensional LUT and the K one dimensional LUT, a reading section can be provided to read the CMY three dimensional LUT and the K one dimensional LUT in the color conversion table creating device 30.

Figure 13:
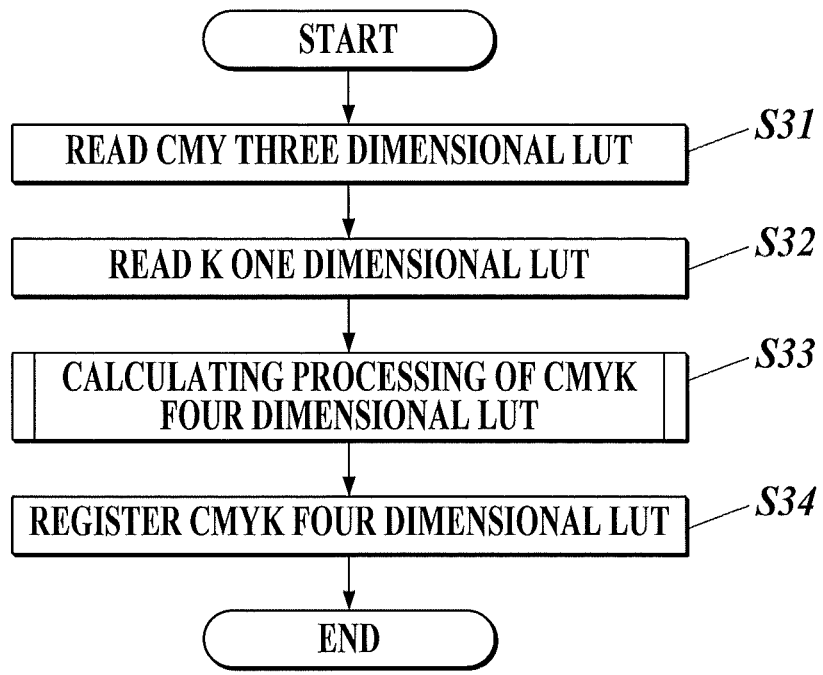
FIG. 13 is a flowchart showing another example of a color conversion table creating processing performed in a color conversion table creating device.
Figure 14:
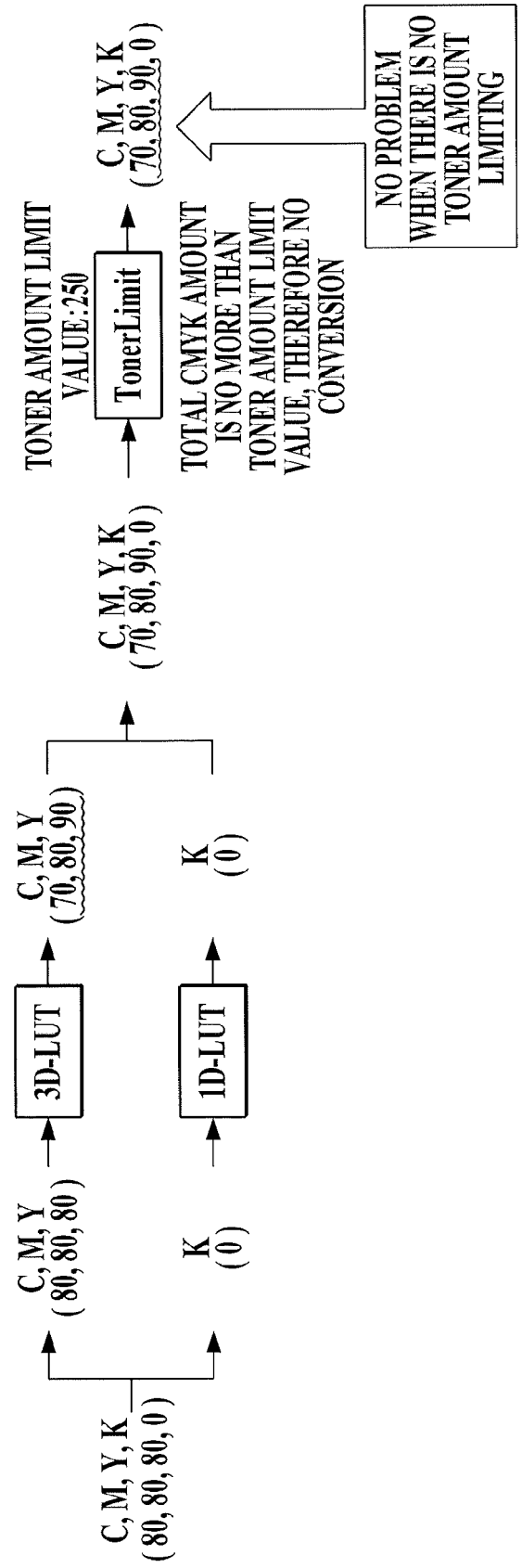
FIG. 14 is a conventional conversion example in which a total CMYK amount is relatively small.
Figure 15:
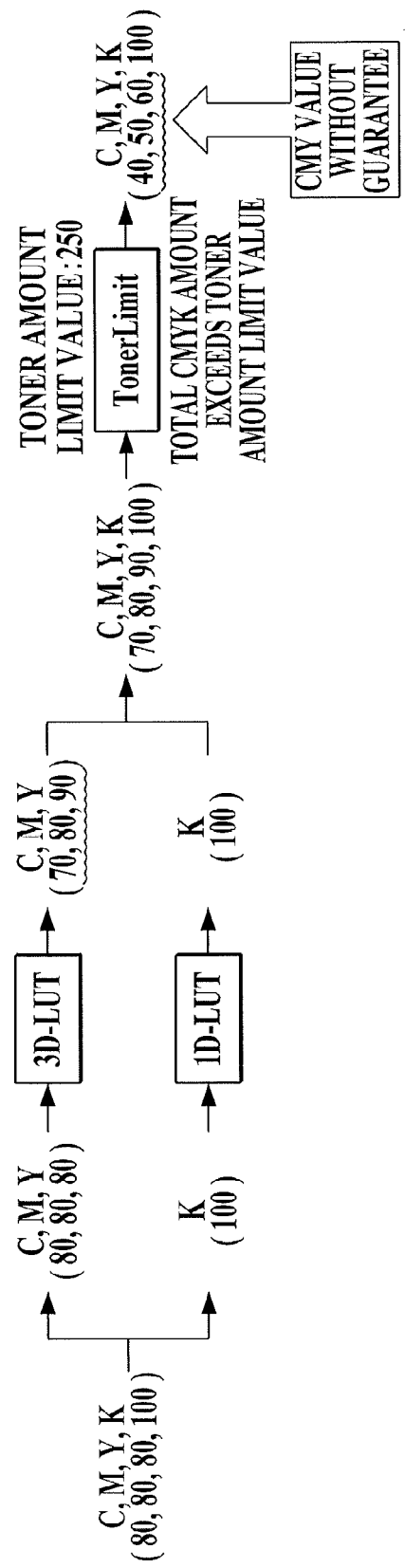
FIG. 15 is a conventional conversion example in which the total CMYK amount is large and a total toner amount is adjusted.

FIG. 13 is a flowchart showing another example of the color conversion table creating processing performed in the color conversion table creating device 30.

The reading section reads the CMY three dimensional LUT and the K one dimensional LUT created by the software or another device (step S31, S32).

Step S33 and step S34 are similar to step S6 and S7 shown in FIG. 6, and therefore the description is omitted.

Figure 9:
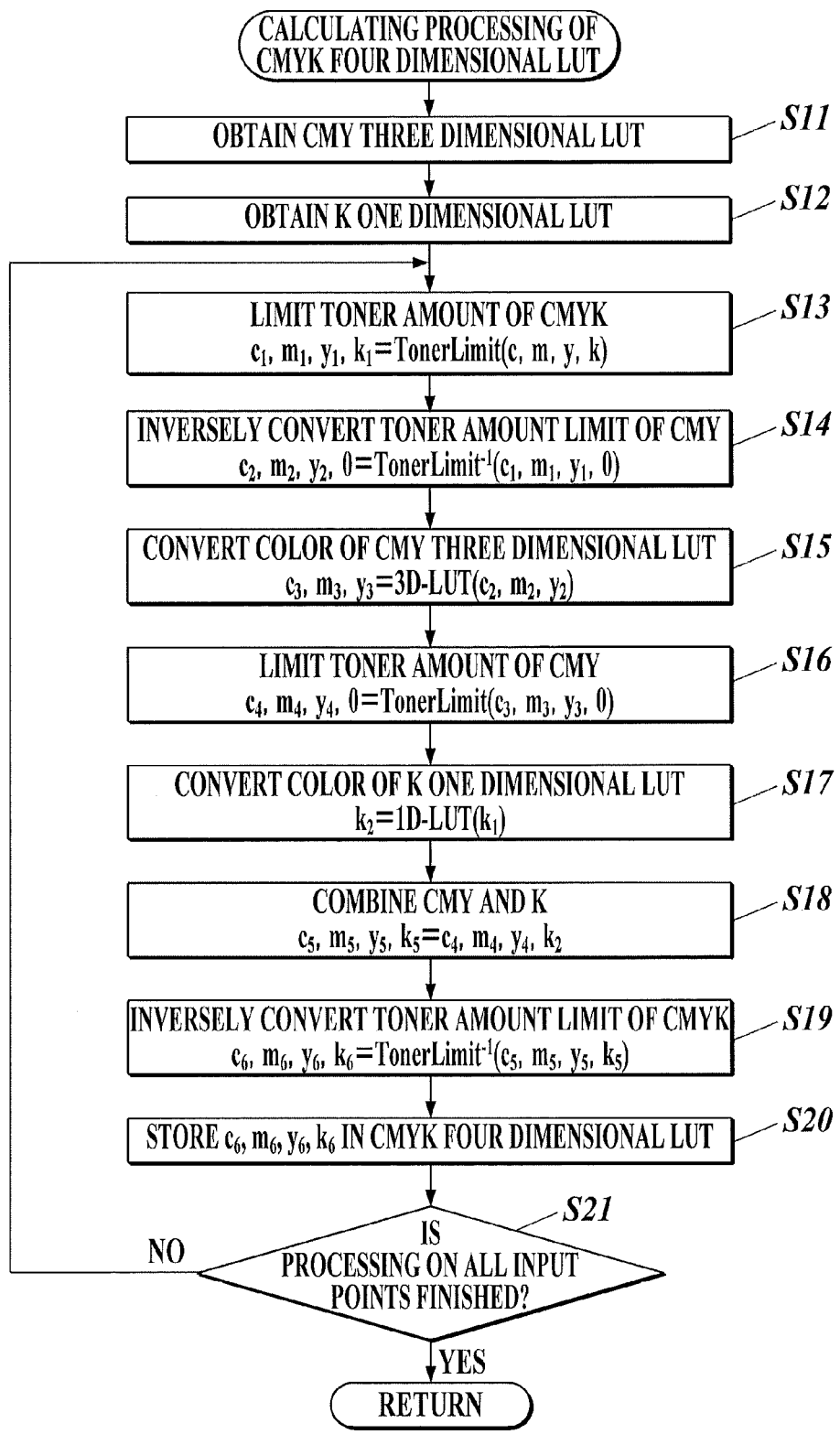
FIG. 9 is a flowchart showing a calculating processing of a CMYK four dimensional LUT.

In this case, the CMY three dimensional LUT and the K one dimensional LUT acquired by reading are obtained in step S11 and step S12 of calculating processing of the CMYK four dimensional LUT shown in FIG. 9.

Alternatively, one of the CMY three dimensional LUT or the K one dimensional LUT can be obtained by calculation and the other can be obtained by reading an already created LUT.

Alternatively, the color material amount limiting processing section, the first color conversion processing section, the second color conversion processing section, the combining section, the color material amount limiting inverse conversion processing section, the output value determining section, the second color material amount limiting inverse conversion processing section and the second color material amount limiting processing section which are realized by the CPU 31 in coordination with the color conversion table creating processing program 331 in the color conversion table creating device 30 can be realized by dedicated hardware.

The present embodiment describes an example of performing toner amount limiting as color material amount limiting. However, color material amount limiting can be performed according to the used color material, such as ink amount limiting which limits the total amount of ink of the color components used.

The above embodiment discloses an example using a non-volatile semiconductor memory or a hard disk as a computer readable medium which stores a program to perform each processing. However, the present invention is not limited to the above. As other computer readable mediums it is possible to apply a portable storage medium such as a CD-ROM, etc. As a medium which provides data of a program through a communication line, a carrier wave can be applied.

According to an aspect of the preferred embodiments of the present invention, there is provided a color conversion table creating device which creates a color conversion table for color conversion from input image data including cyan, magenta, yellow, and black to output image data including cyan, magenta, yellow, and black, the device including:

a color material amount limiting processing section which performs color material amount limiting which limits a total amount of color components for each combination of an input value in the color conversion table;

a first color conversion processing section which performs color conversion on a cyan component, a magenta component, and a yellow component after the color material amount limiting by the color material amount limiting processing section, using a three dimensional table for color conversion from a cyan component, a magenta component, and a yellow component of the input image data to a cyan component, a magenta component, and a yellow component of the output image data;

a second color conversion processing section which performs color conversion on a black component after the color material amount limiting by the color material amount limiting processing section using a one dimensional table for color conversion from a black component of the input image data to a black component of the output image data;

a combining section which combines the cyan component, the magenta component, and the yellow component after the color conversion using the three dimensional table with the black component after the color conversion using the one dimensional table;

a color material amount limiting inverse conversion processing section which performs inverse conversion of the color material amount limiting on the cyan component, the magenta component, the yellow component, and the black component combined by the combining section; and an output value determining section which sets the cyan component, the magenta component, the yellow component, and the black component after the inverse conversion of the color material amount limiting by the color material amount limiting inverse conversion processing section as a combination of an output value in the color conversion table.

Preferably, the color conversion table creating device further includes:

a second color material amount limiting inverse conversion processing section which performs inverse conversion of the color material amount limiting on the cyan component, the magenta component, and the yellow component after the color material amount limiting by the color material amount limiting processing section; and a second color material amount limiting processing section which performs color material amount limiting on the cyan component, the magenta component, and the yellow component after the color conversion using the three dimensional table, wherein the first color conversion processing section performs color conversion using the three dimension table on the cyan component, the magenta component, and the yellow component after the inverse conversion of the color material amount limiting by the second color material amount limiting inverse conversion processing section; and the combining section combines the cyan component, the magenta component, and the yellow component after the color material amount limiting by the second color material amount limiting processing section, with the black component after the color conversion using the one dimensional table.

According to another aspect of the preferred embodiments of the present invention, there is provided a color conversion table creating method which creates a color conversion table for color conversion from input image data including cyan, magenta, yellow, and black to output image data including cyan, magenta, yellow, and black, the method including:

performing color material amount limiting which limits a total amount of color components for each combination of an input value in the color conversion table;

performing color conversion on a cyan component, a magenta component, and a yellow component after the color material amount limiting by the color material amount limiting processing step, using a three dimensional table for color conversion from a cyan component, a magenta component, and a yellow component of the input image data to a cyan component, a magenta component, and a yellow component of the output image data;

performing color conversion on a black component after the color material amount limiting by the color material amount limiting processing step using a one dimensional table for color conversion from a black component of the input image data to a black component of the output image data;

combining the cyan component, the magenta component, and the yellow component after the color conversion using the three dimensional table with the black component after the color conversion using the one dimensional table;

performing inverse conversion of the color material amount limiting on the cyan component, the magenta component, the yellow component, and the black component combined by the combining step; and setting the cyan component, the magenta component, the yellow component, and the black component after the inverse conversion of the color material amount limiting by the color material amount limiting inverse conversion processing step as a combination of an output value in the color conversion table.

According to an aspect of the preferred embodiments of the present invention, there is provided a non-transitory computer-readable storage medium having a program stored thereon for controlling a computer which creates a color conversion table for color conversion from input image data including cyan, magenta, yellow, and black to output image data including cyan, magenta, yellow, and black, the program to control the computer to function as:

a color material amount limiting processing section which performs color material amount limiting which limits a total amount of color components for each combination of an input value in the color conversion table;

a first color conversion processing section which performs color conversion on a cyan component, a magenta component, and a yellow component after the color material amount limiting by the color material amount limiting processing section, using a three dimensional table for color conversion from a cyan component, a magenta component, and a yellow component of the input image data to a cyan component, a magenta component, and a yellow component of the output image data;

a second color conversion processing section which performs color conversion on a black component after the color material amount limiting by the color material amount limiting processing section using a one dimensional table for color conversion from a black component of the input image data to a black component of the output image data;

a combining section which combines the cyan component, the magenta component, and the yellow component after the color conversion using the three dimensional table with the black component after the color conversion using the one dimensional table;

a color material limiting inverse conversion processing section which performs inverse conversion of the color material amount limiting on the cyan component, the magenta component, the yellow component, and the black component combined by the combining section; and an output value determining section which sets the cyan component, the magenta component, the yellow component, and the black component after the inverse conversion of the color material amount limiting by the color material amount limiting inverse conversion processing section as a combination of an output value in the color conversion table.

Consequently, according to the above, when the color conversion table is created based on the three dimensional table of cyan, magenta, and yellow and the one dimensional table of black, it is possible to prevent decrease of accuracy of color conversion using the created color conversion table by considering the color material amount limiting performed after the color conversion.

The present application is based on Japanese Patent Application No. 2011-284963 filed on Dec. 27, 2011 to the Japanese Patent Office, which shall be a basis for correcting mistranslations.

What is claimed is:

1. A color conversion table creating device which creates a color conversion table for color conversion from input image data including cyan, magenta, yellow, and black to output image data including cyan, magenta, yellow, and black, the device comprising:

a color material amount limiting processing section which performs color material amount limiting which limits a total amount of color components for each combination of an input value in the color conversion table;

a first color conversion processing section which performs color conversion on a cyan component, a magenta component, and a yellow component after the color material amount limiting by the color material amount limiting processing section, using a three dimensional table for color conversion from a cyan component, a magenta component, and a yellow component of the input image data to a cyan component, a magenta component, and a yellow component of the output image data;

a second color conversion processing section which performs color conversion on a black component after the color material amount limiting by the color material amount limiting processing section using a one dimensional table for color conversion from a black component of the input image data to a black component of the output image data;

a combining section which combines the cyan component, the magenta component, and the yellow component after the color conversion using the three dimensional table with the black component after the color conversion using the one dimensional table;

a color material limiting inverse conversion processing section which performs inverse conversion of the color material amount limiting on the cyan component, the magenta component, the yellow component, and the black component combined by the combining section; and an output value determining section which sets the cyan component, the magenta component, the yellow component, and the black component after the inverse conversion of the color material amount limiting by the color material amount limiting inverse conversion processing section as a combination of an output value in the color conversion table.

2. The color conversion table creating device of claim 1, further comprising:

a second color material amount limiting inverse conversion processing section which performs inverse conversion of the color material amount limiting on the cyan component, the magenta component, and the yellow component after the color material amount limiting by the color material amount limiting processing section; and a second color material amount limiting processing section which performs color material amount limiting on the cyan component, the magenta component, and the yellow component after the color conversion using the three dimensional table, wherein the first color conversion processing section performs color conversion using the three dimension table on the cyan component, the magenta component, and the yellow component after the inverse conversion of the color material amount limiting by the second color material amount limiting inverse conversion processing section; and the combining section combines the cyan component, the magenta component, and the yellow component after the color material amount limiting by the second color material amount limiting processing section, with the black component after the color conversion using the one dimensional table.

3. A color conversion table creating method which creates a color conversion table for color conversion from input image data including cyan, magenta, yellow, and black to output image data including cyan, magenta, yellow, and black, the method comprising:

performing color material amount limiting which limits a total amount of color components for each combination of an input value in the color conversion table;

performing color conversion on a cyan component, a magenta component, and a yellow component after the color material amount limiting by the color material amount limiting processing step, using a three dimensional table for color conversion from a cyan component, a magenta component, and a yellow component of the input image data to a cyan component, a magenta component, and a yellow component of the output image data;

performing color conversion on a black component after the color material amount limiting by the color material amount limiting processing step using a one dimensional table for color conversion from a black component of the input image data to a black component of the output image data;

combining the cyan component, the magenta component, and the yellow component after the color conversion using the three dimensional table with the black component after the color conversion using the one dimensional table;

performing inverse conversion of the color material amount limiting on the cyan component, the magenta component, the yellow component, and the black component combined by the combining step; and setting the cyan component, the magenta component, the yellow component, and the black component after the inverse conversion of the color material amount limiting by the color material amount limiting inverse conversion processing step as a combination of an output value in the color conversion table.

4. A non-transitory computer-readable storage medium having a program stored thereon for controlling a computer which creates a color conversion table for color conversion from input image data including cyan, magenta, yellow, and black to output image data including cyan, magenta, yellow, and black, the program to control the computer to function as:

a color material amount limiting processing section which performs color material amount limiting which limits a total amount of color components for each combination of an input value in the color conversion table;

a first color conversion processing section which performs color conversion on a cyan component, a magenta component, and a yellow component after the color material amount limiting by the color material amount limiting processing section, using a three dimensional table for color conversion from a cyan component, a magenta component, and a yellow component of the input image data to a cyan component, a magenta component, and a yellow component of the output image data;

a second color conversion processing section which performs color conversion on a black component after the color material amount limiting by the color material amount limiting processing section using a one dimensional table for color conversion from a black component of the input image data to a black component of the output image data;

a combining section which combines the cyan component, the magenta component, and the yellow component after the color conversion using the three dimensional table with the black component after the color conversion using the one dimensional table;

a color material limiting inverse conversion processing section which performs inverse conversion of the color material amount limiting on the cyan component, the magenta component, the yellow component, and the black component combined by the combining section; and an output value determining section which sets the cyan component, the magenta component, the yellow component, and the black component after the inverse conversion of the color material amount limiting by the color material amount limiting inverse conversion processing section as a combination of an output value in the color conversion table.

* * * * *